US008826327B2

(12) United States Patent
Adimatyam et al.

(10) Patent No.: US 8,826,327 B2
(45) Date of Patent: Sep. 2, 2014

(54) PROVISIONING AN EMERGENCY ALERT SYSTEM (EAS) MESSAGE SERVICE TO USER DEVICES

(75) Inventors: Venkata S. Adimatyam, Irving, TX (US); Michael J. Runne, Hurst, TX (US); Sameer V. Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 314 days.

(21) Appl. No.: 13/238,773

(22) Filed: Sep. 21, 2011

(65) Prior Publication Data

US 2013/0074120 A1 Mar. 21, 2013

(51) Int. Cl.
*H04N 7/10* (2006.01)
*H04N 21/258* (2011.01)
*H04N 21/488* (2011.01)
*H04N 21/81* (2011.01)

(52) U.S. Cl.
CPC ..... *H04N 21/25841* (2013.01); *H04N 21/4882* (2013.01); *H04N 21/814* (2013.01); *H01N 21/26258* (2013.01)
USPC .............................................. 725/33; 725/32

(58) Field of Classification Search
CPC .......................... H04N 21/814; H04N 21/8126
USPC ....................................................... 725/32, 33
See application file for complete search history.

(56) References Cited

U.S. PATENT DOCUMENTS

2007/0136743 A1* 6/2007 Hasek et al. ..................... 725/33
2010/0138858 A1* 6/2010 Velazquez et al. ............... 725/33
2011/0265116 A1* 10/2011 Stern et al. ....................... 725/35

* cited by examiner

*Primary Examiner* — Nasser Goodarzi
*Assistant Examiner* — Michael Hong

(57) ABSTRACT

A system is configured to receive, from a user device, a request for video content; obtain the video content in response to the request; process the video content to generate one or more first segments, where each of the first segments corresponds to a respective portion of the video content; receive an emergency alert system (EAS) message; process the EAS message to generate one or more second segments, where each of the second segments corresponds to a respective portion of the EAS message; and transmit, to the user device, a playlist, associated with the video content, that includes the first segments and the second segments, where the playlist allows the user device to play the video content on a particular channel based on the first segments, and allows the user device to play the EAS message, based on the second segments, without tuning to a channel different from the particular channel.

22 Claims, 7 Drawing Sheets

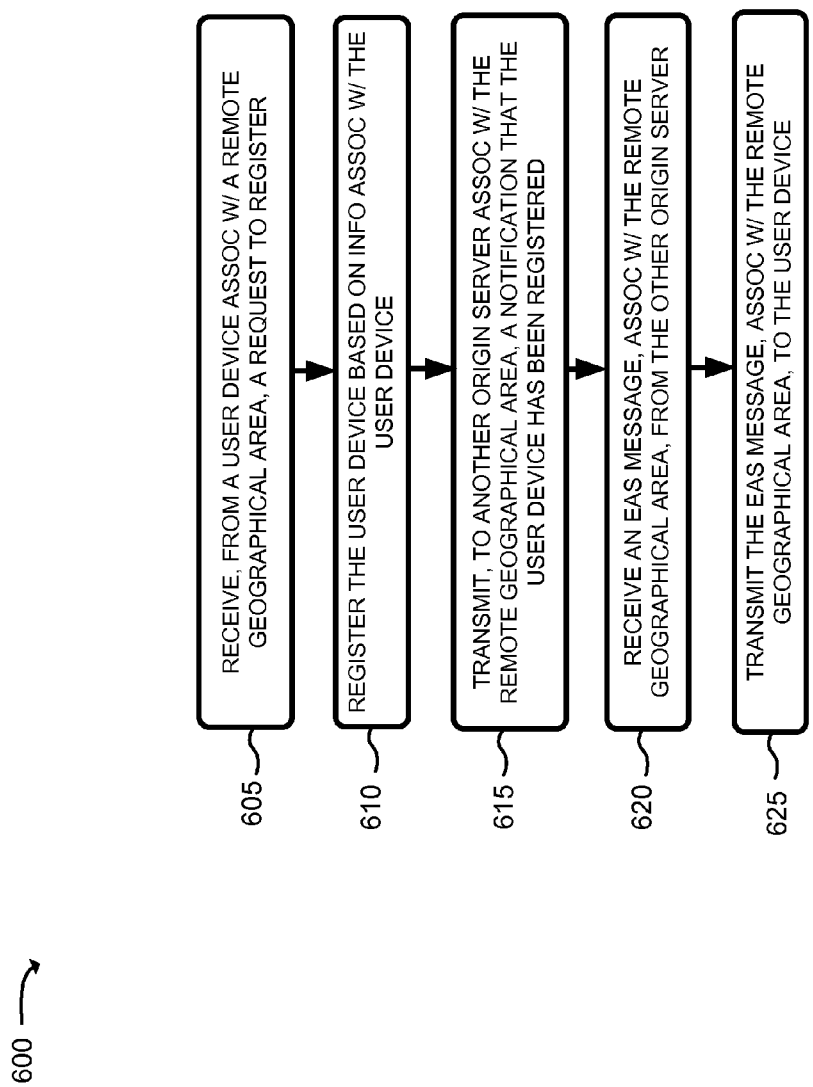

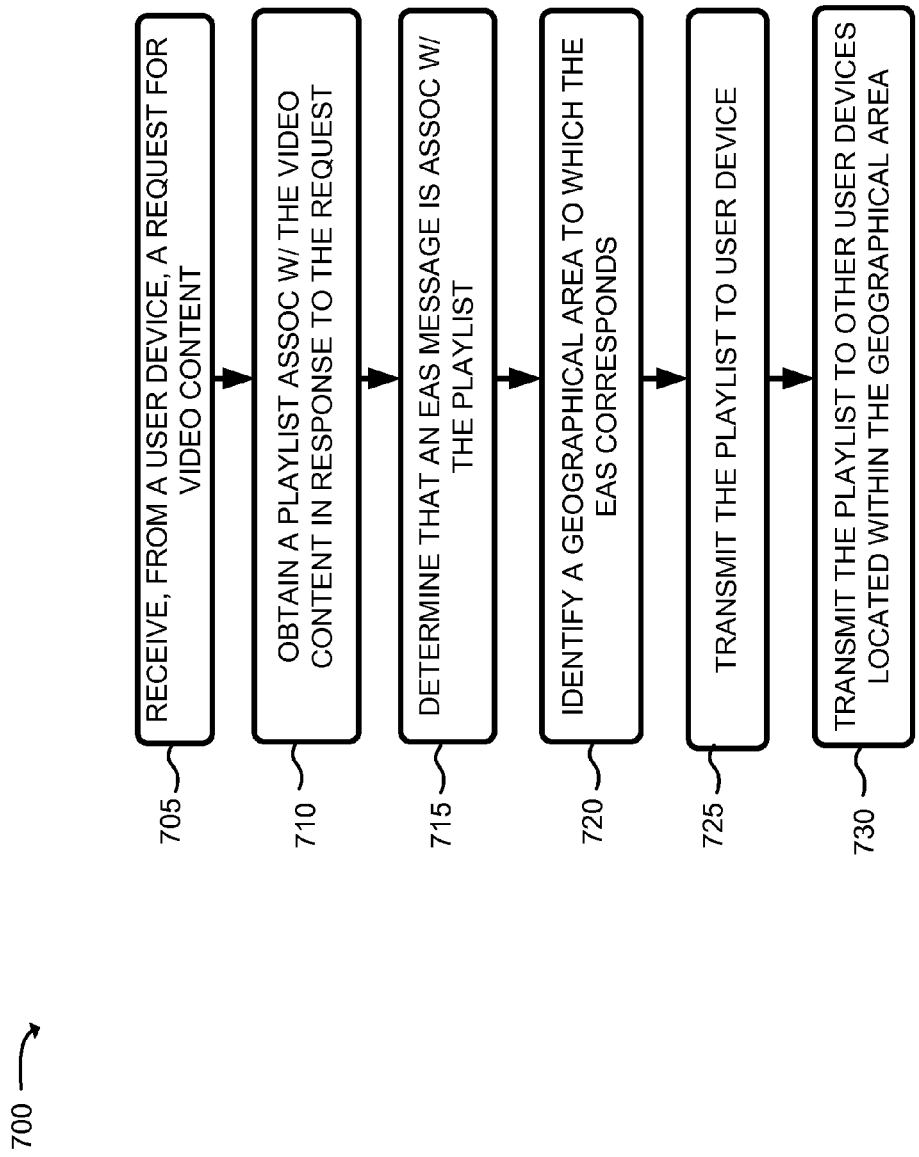

PROVISIONING AN EMERGENCY ALERT SYSTEM (EAS) MESSAGE SERVICE TO USER DEVICES

BACKGROUND

Television networks broadcast television content to video client devices that allow users, of the video client devices, to view the television content when the video client devices are tuned to a particular channel via which the television content is being broadcast. When a television network receives a message, from an emergency alert system (EAS), the television network may transmit the EAS message to the video client devices via one or more channels. The video client devices may receive the EAS message and may automatically tune to one of the channels to allow the EAS message to be viewed by the users.

More and more user devices, such as mobile wireless handheld devices, tablet computers, laptop computers, etc., are capable of receiving broadcast television content from content providers. The user devices may receive the broadcast television content, via video streams, from networks other than the television networks, such as a service provider network, the Internet, etc. Unfortunately, the networks, other than the television networks, may not always transmit the EAS messages in a manner that can be processed by and/or displayed on the user devices.

BRIEF DESCRIPTION OF THE DRAWINGS

FIG. 6 is a flow chart of an example process 600 for registering a user device, associated with a remote geographic area, with an origin server to receive an EAS message associated with the remote geographic area, according to an implementation described herein; and FIG. 7 is a flow chart of an example process for provisioning an EAS message service to user devices based on a geographic area to which the EAS message corresponds.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a messaging service, associated with an Emergency Alert System (EAS), to be provisioned to a user device that is receiving broadcast video content from a service provider network. The service provider network may include a network other than a television network, such as a cell phone service provider, an internet service provider, etc.).

The system and/or method may allow an origin server to generate a playlist, associated with video content, in a manner that includes a message, associated with the EAS (hereinafter referred to as an "EAS message") that has been converted to a video format. The system and/or method may allow the origin server to distribute the playlist to a content distribution system associated with a geographic area to which the EAS message corresponds. The system and/or method may allow the content distribution system to transmit the playlist to one or more user devices that have requested the video content and/or are located within the geographic area. The system and/or method may allow the user devices to receive and/or play the EAS message via a channel on which the video content was received and/or is being played. The system and/or method may allow the user devices to play the EAS message in a manner that does not include changing to another channel, as is the case where a video client device receives the EAS message via a television network.

The system and/or method may allow the origin server to transmit the EAS message to a remote origin server that is not associated with the geographic area. Transmitting the EAS message, to the remote origin server, may allow the remote origin server to transmit the EAS message to another user device, that has registered with the remote origin server, to receive EAS messages associated with the geographic area.

The system and/or method may, in another implementation, allow an origin server to receive an EAS message, associated with a geographic area, and to generate an EAS notification based on the EAS message. The origin server may transmit the EAS notification to a content distribution system in a manner that does not include generating a playlist. The system and/or method may allow the content distribution system to transmit the EAS notification to one or more user devices that are located within the geographic area.

The system and/or method may allow the origin server to transmit the EAS notification to a remote origin server that is not associated with the geographic area. Transmitting the EAS notification, to the remote origin server, may allow the remote origin server to transmit the EAS notification to another user device, that has registered with the remote origin server, to receive EAS messages associated with the geographic area.

Figure 1:
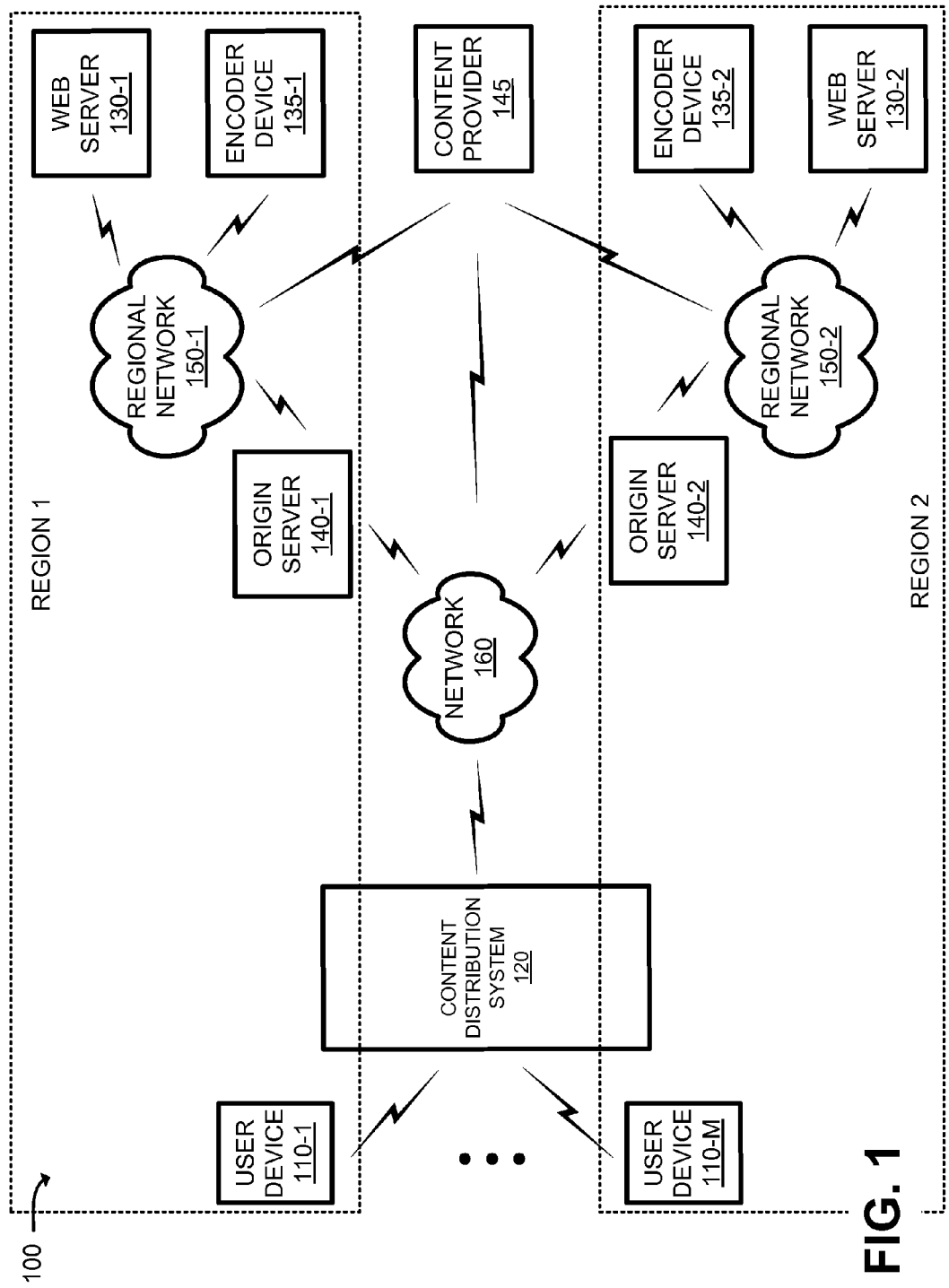
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include a group of user devices 110-1, . . . , 110-M (where M≥1) (hereinafter referred to collectively as "user devices 110" and individually as "user device 110"), a content distribution system 120, a pair of web servers 130-1 and 130-2 (hereinafter referred to collectively as "web servers 130" and individually as "web server 130"), a pair of encoder devices 135-1 and 135-2 (hereinafter referred to collectively as "encoder devices 135" and individually as "encoder device 135"), a pair of origin servers 140-1 and 140-2 (hereinafter referred to collectively as "origin servers 140" and individually as "origin server 140"), a content provider 145, a pair of regional networks 150-1 and 150-2 (hereinafter referred to collectively as "regional networks 150" and individually as "regional network 150") and a network 160. The number of devices, systems, and/or networks, illustrated in FIG. 1, is provided for explanatory purposes only. In practice, there may be additional devices, systems, and/or networks; fewer devices, systems, and/or networks; different devices, systems, and/or networks; or differently arranged devices, systems, and/or networks than illustrated in FIG. 1.

Also, in some implementations, one or more of the devices of environment 100 may perform one or more functions described as being performed by another one or more of the devices of environment 100. For example, encoder device 135 and origin server 140 may be integrated into a single device. Devices, systems, and/or networks of environment 100 may interconnect via wired connections, wireless connections, or a combination of wired and wireless connections.

User device 110-1, web server 130-1, encoder device 135-1, origin server 140-1, and/or regional network 150-1 may be associated with and/or located within a first geographic area and/or region (e.g., as shown as a dashed rectangle labeled as "REGION 1" in FIG. 1). User device 110-M, web server 130-2, encoder device 135-2, origin server 140-2, and/or regional network 150-2 may be associated with and/or located within a second geographic area and/or region (e.g., as shown as a dashed rectangle labeled as "REGION 2" in FIG. 1). CDS 120 is described below as being associated with the first and second regions. In another example implementation, a first CDS 120 may be associated with the first region and a second CDS 120 may be associated with a second region. In a further example implementation, CDS 120 may not be associated with the first region or the second region.

User device 110 may include any computation or communication device, such as a wireless mobile communication device that is capable of communicating with CDS 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of mobile computation or communication device.

CDS 120 may include one or more devices that gather, process, search, store, and/or provide information in a manner similar to that described herein. CDS 120 may perform operations associated with content distribution within environment 100. In an example implementation, CDS 120 may be implemented as an actual content distribution network within environment 100. CDS 120 may perform caching operations on streaming video content, a playlist associated with broadcast video content (e.g., that identifies segments or chunks associated with an EAS message and/or video content, etc.), an EAS notification, etc. received from content provider 145 and/or origin server 140. CDS 120 may perform the caching operations by temporarily storing the streaming video content, playlist, EAS message, etc. in a memory associated with CDS 120. CDS 120 may retrieve particular content, from the memory, and may transmit the content, to user device 110, based on a format, protocol, and/or data rate that can be received, processed, and/or played by different types of user devices 110.

CDS 120 may receive, from origin server 140, a playlist that includes an EAS message. CDS 120 may identify a geographic area to which the EAS message corresponds and may transmit the EAS message to one or more user devices 110 that are located within the geographic area. In another example implementation, CDS 120 may receive an EAS notification from origin server 140. CDS 120 may identify a geographic area to which the EAS notification corresponds and may transmit the EAS notification, using a protocol (e.g., an Internet protocol (IP), a hypertext transfer language protocol (HTTP), etc.) to one or more user devices 110 that are located within the geographic area.

Web server 130 may include one or more server devices, or other types of computation or communication devices, that gather, process, search, store, and/or provide information in a manner described herein. In an example implementation, web server 130 may be associated with a government agency (e.g., at a local, state, or federal level) associated with an Emergency Alert System. Web server 130 may generate an EAS message when a natural and/or man-made event occurs or is likely to occur, such as inclement weather (e.g., a blizzard, a tropical storm, etc.), hazardous road conditions, a flood, an earthquake, a fire, a missing child (e.g., such as an Amber alert), a natural security event (e.g., a terrorist attack) etc. Web server 130 may transmit the EAS message via a radio broadcast (e.g., via a base station that transmits the EAS message using an amplitude modulation (AM), frequency modulation (FM), etc.), via regional network 150 and/or network 160 (e.g., based on a common alerting protocol (CAP) message format and/or some other format), etc.

Encoder device 135 may include one or more devices that monitor, encode, decode, and/or transmit information in a manner described herein. In an example implementation, encoder device 135 may monitor radio broadcasts, Internet-based messages, etc. to detect and/or obtain EAS messages that are generated by web server 130 (e.g., associated with local, state, and/or federal agencies). For example, encoder device 135 may monitor radio broadcasts (e.g., via AM and/or FM broadcast signals that are transmitted from local and/or regional radio stations), message traffic (e.g., via CAP messages sent via web services hosted by web server 130), etc. to detect an EAS message. Encoder device 135 may obtain the detected EAS message and may process the EAS message.

Encoder device 135 may, in one example, encode the EAS message as a video stream (e.g., based on a moving picture experts group (MPEG) 2 transport stream (m2ts) and/or some other video format or protocol). Encoder device 135 may create segments (sometimes referred to as chunks) of the encoded stream that can be included in a playlist, associated with broadcast video content obtained from origin server 140. The playlist may include segments associated with the video content (hereinafter referred to as "video content segments") and the segments associated with the EAS message (hereinafter referred to as "EAS segments"). Each segment may correspond to a respective period of playing time (e.g., two seconds, five seconds, ten seconds, etc.) that is a respective portion of a total period of playing time associated with the playlist. Encoder 135 may transmit the EAS segments to origin server 140.

Encoder device 135 may, in another example, convert the EAS message into a format (e.g., a text format, an image format, an audio format, etc.) that can be overlaid and/or integrated into video content segments to be included within a playlist associated with the video content. In this example, the playlist may include a first portion of the video content segments that include a respective portion of the converted EAS message, and a second portion of the video content segments that do not include any of the converted EAS message. Encoder 135 may transmit, to origin server 140, the first portion and/or the second portion of the video content segments.

Origin server 140 may include one or more server devices, or other types of computation or communication devices, that gather, process, search, store, and/or provide information in a manner described herein. Origin server 140 may generate a playlist, associated with video content and/or an EAS message, for distribution to user device 110 via CDS 120. Origin server 140 may transmit EAS messages to user device 110 and/or to another origin server 140 that is associated with another region that is different than a region with which origin server 140 is associated.

Origin server 140 may, for example, receive, from user device 110, a request for video content and may, in response to the request, obtain the video content from content provider 145. Origin server 140 may generate video content segments and/or may communicate with encoder device 135 to obtain the video content segments. Origin server 140 may receive, from encoder device 135, EAS segments and may generate a playlist, associated with the video content, that includes the video content segments and/or the EAS segments. In another example, origin server 140 may receive, from encoder device 135, video content segments that include respective portions of the EAS message integrated into all or a portion of the video content segments. Origin server 140 may generate a playlist based on the segments associated with the video content and/or associated with the EAS message and may transmit the playlist to CDS 120 for distribution to user device 110 in response to the request for the video content.

Origin server 140 (e.g., origin server 140-1) may be associated with a first geographic area (e.g., that corresponds to region 1 in FIG. 1) and may determine that an EAS message (e.g., based on the EAS segments) corresponds to the first geographic area. Origin server 140-1 may transmit the EAS segments, via CDS 120, to one or more user devices 110 that are located within the first geographic area. Additionally, or alternatively, origin server 140-1 may transmit the playlist to all or a portion of the one or more user devices 110 that are located within the first geographic area and/or that request the video content.

Origin server 140 may also, or alternatively, transmit the EAS segments to another origin server 140 (e.g., origin server 140-2) associated with a second geographic area (e.g., that corresponds to region 2 in FIG. 1). Origin server 140-2 may receive the EAS segments and may transmit, via CDS 120, the EAS segments to another user device 110 that is located within the second geographic area and/or that has subscribed to an EAS service associated with the first geographic area.

Origin server 140 may also, or alternatively, determine that EAS segments correspond to the second geographic area. Origin server 140-1 may transmit the EAS segments, that correspond to the second geographic area, to origin server 140-2, based on the determination that that the EAS segments correspond to the second geographic area. Origin server 140-2 may receive the EAS segments and may transmit the EAS segments to one or more user devices 110 that are located within the second geographic region.

Content provider 145 may include any type or form of content provider. For example, content provider 145 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 145 may produce media streams (e.g., television broadcasts). A "media stream," as used herein, may refer to a stream of content that includes video content (e.g., a video stream), audio content (e.g., an audio stream), and/or textual content (e.g., a textual stream).

Regional network 150 may include one or more wired and/or wireless networks from which video content and/or EAS messages are received. For example, regional network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. In another example, regional network 150 may include a code division multiple access (CDMA) network and/or device, a global system for mobile communications (GSM) network and/or device, a general packet radio services (GPRS) network and/or device, or a combination of a CDMA, GSM, GPRS networks and/or other devices. Additionally, or alternatively, regional network 150 may include a wide area network (WAN), a metropolitan area network (MAN), an ad hoc network, an intranet, and/or a combination of these or other types of networks.

Network 160 may include one or more wired and/or wireless networks. For example, network 160 may include a cellular network, the PLMN, a 2G network, a 3G network, a 4G network (e.g., an LTE network), a 5G network, and/or another network. Additionally, or alternatively, network 160 may include a WAN, a MAN, a telephone network (e.g., the Public Switched Telephone Network (PSTN)), an ad hoc network, an intranet, the Internet, and/or a combination of these or other types of networks.

Figure 2:
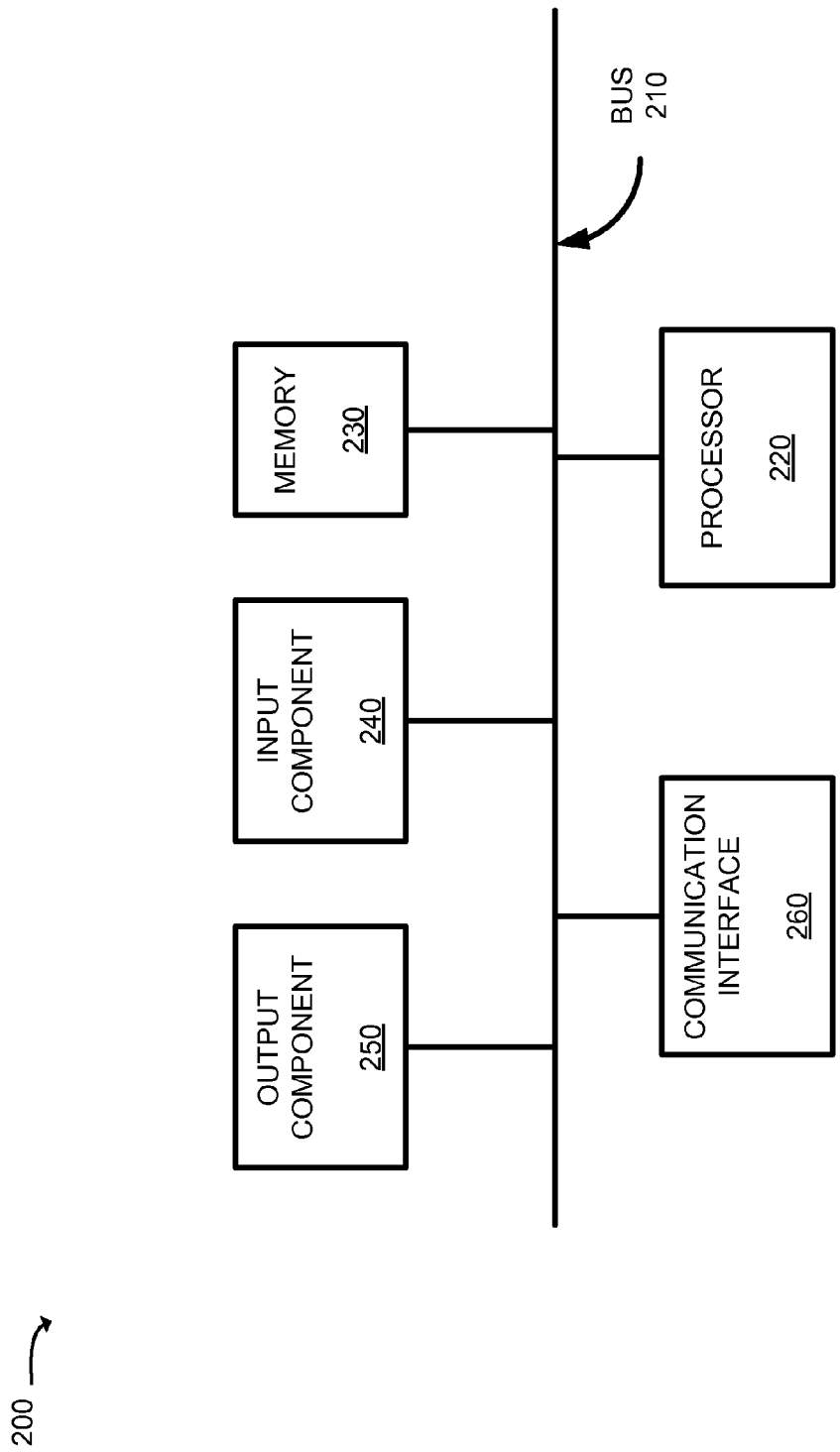
FIG. 2 is a diagram of an example device that may be associated with a content distribution system of FIG. 1.

FIG. 2 is a diagram of example components of a device 200 that may correspond to user device 110, CDS 120, web server 130, encoder device 135, origin server 140, and/or content provider 145. Alternatively, each of user device 110, CDS 120, web server 130, encoder device 135, origin server 140, and/or content provider 145 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path, or a collection of paths, that permits communication among the components of device 200. Processor 220 may include a processor, microprocessor, or processing logic that interprets and executes instructions. Memory 230 may include any type of dynamic storage device that stores information and instructions for execution by processor 220, and/or any type of non-volatile storage device that stores information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as regional network 150 and/or network 160. In one alternative implementation, communication interface 260 may be a logical component that includes input and output ports, input and output systems, and/or other input and output components that facilitate the transmission of data to other devices.

As will be described in detail below, device 200 may perform certain operations relating to provisioning an EAS messaging service. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
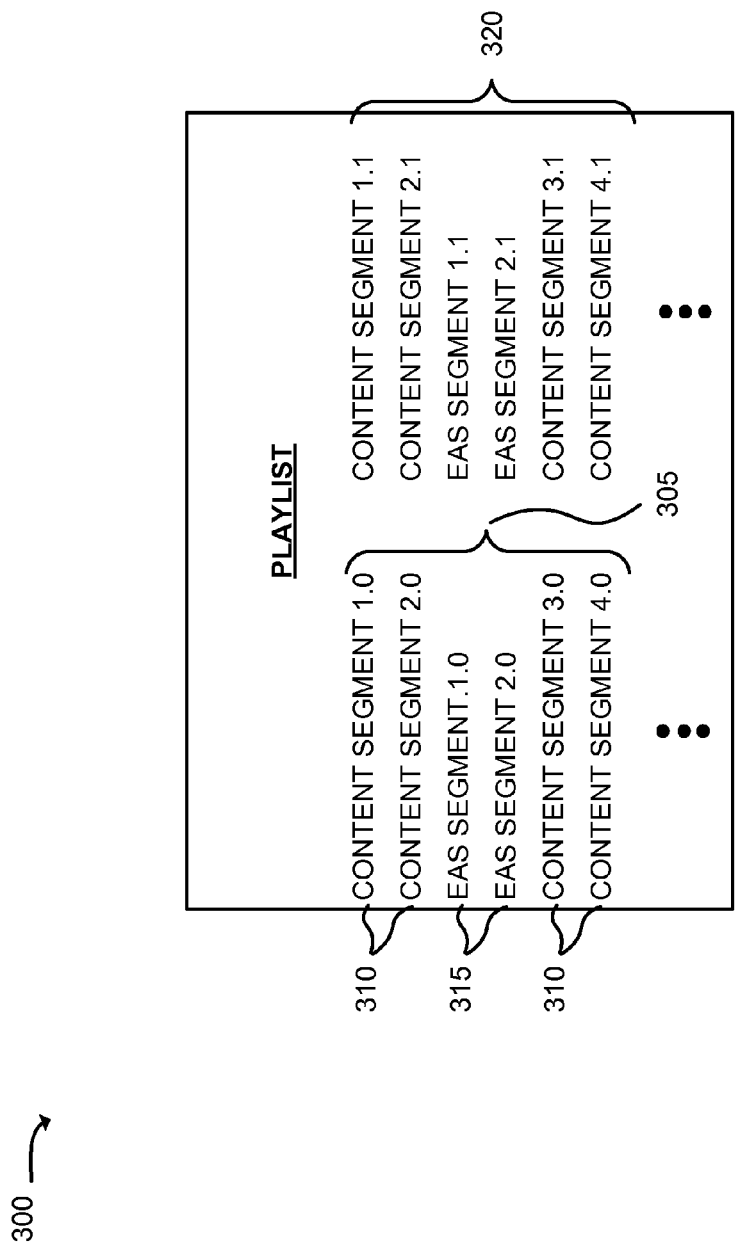
FIG. 3 is a diagram of an example playlist that identifies segments associated with video content and/or an emergency alert system (EAS) message, according to an implementation described herein.

FIG. 3 is a diagram of an example playlist 300 that identifies segments associated with video content and/or an EAS message, according to an implementation described herein. As shown in FIG. 3, playlist 300 may include a segment list 305 and a segment list 320. The number of segment lists, illustrated in FIG. 3, is provided for explanatory purposes only. In practice, there may be additional segment lists, fewer segment lists, different segment lists, or differently arranged segment lists than illustrated in FIG. 3.

Segment list 305 may include a set of video content segments 310 and a set of EAS segments 315. Video content segment 310 may represent a video content segment associated with a portion of video content. In one example, a first video content segment 310 (e.g., content segment 1.0) may correspond to a first portion of video content that may be played, by user device 110, within a period of time (e.g., two seconds, five seconds, ten seconds, etc.). The first video content segment 310 may also be associated with a first data rate (e.g., 200 kilobytes per second (kbps), 400 kbps, etc.) at which the first portion of the video content is to be transmitted and/or streamed to user device 110. In another example, a second video content segment 310 (e.g., content segment 2.0) may correspond to a second portion of video content that may be played, by user device 110, within another period of time (e.g., two seconds, five seconds, ten seconds, etc.). The second video content segment 310 may also be associated with the first data rate at which the second portion of the video content is to be transmitted and/or streamed to user device 110. Segment list 305 may include additional video content segments 310 (e.g., content segment 3.0, 4.0, etc.) that may be played within other periods of time and/or at the first data rate.

EAS segment 315 may represent an EAS segment, associated with a portion of an EAS message, that is included within playlist 300. EAS segment 315 may store information that identifies a geographic area (e.g., a zip code, a federal information processing standard (FIPS) code, a county name, etc.) to which the EAS message corresponds. EAS segment 315 may also store message content, associated with the EAS message (e.g., text, one or more images, video content, etc.). In one example, a first EAS segment 315 (e.g., EAS segment 1.0) may correspond to a first portion of an EAS message that is to be played, by user device 110, within a period of time (e.g., two seconds, five seconds, ten seconds, etc.). The first EAS segment 315 may also be associated with the first data rate at which the first portion of the EAS message is to be transmitted and/or streamed to user device 110. In another example, a second EAS segment 315 (e.g., EAS segment 2.0) may correspond to a second portion of the EAS message to be played, by user device 110, within another period of time (e.g., two seconds, five seconds, ten seconds, etc.). The second EAS segment 315 may also be associated with the first data rate at which the second portion of the EAS message is to be transmitted and/or streamed to user device 110. Segment list 305 may include additional EAS segments 315 that may be played within other periods of time and/or at the first data rate.

The portions of the EAS message, associated with the first and/or second EAS segments 315, may cause the video content, when being played by user device 110, to be interrupted in order to play the first and/or second portions of the EAS message. The point at which the video content is interrupted may depend on a location, within segment list 305, that EAS segments 315 are located relative to video content segments 310. As a result, user device 110 may play the portions of the EAS message without having to tune to another channel to receive and/or play the portions of the EAS message.

Segment list 320 may include a second set of video content segments 310 and/or EAS segments 315. The second set of video content segments 310 may be associated with a second data rate (e.g., 200 kbps, 400 kbps, 750 kbps, etc.) at which one or more portions of the video content (e.g., represented by content segments 1.1, 2.1, 3.1, etc.), associated with the second set of video content segments 310, are to be transmitted and/or streamed to user device 110. Additionally, or alternatively, the second set of EAS segments 315 may be associated with the second data rate at which one or more portions of the EAS message (e.g., represented by EAS segments 1.1, 2.1, etc.), associated with the second set of EAS segments 315, are to be transmitted and/or streamed to user device 110.

Figure 4:
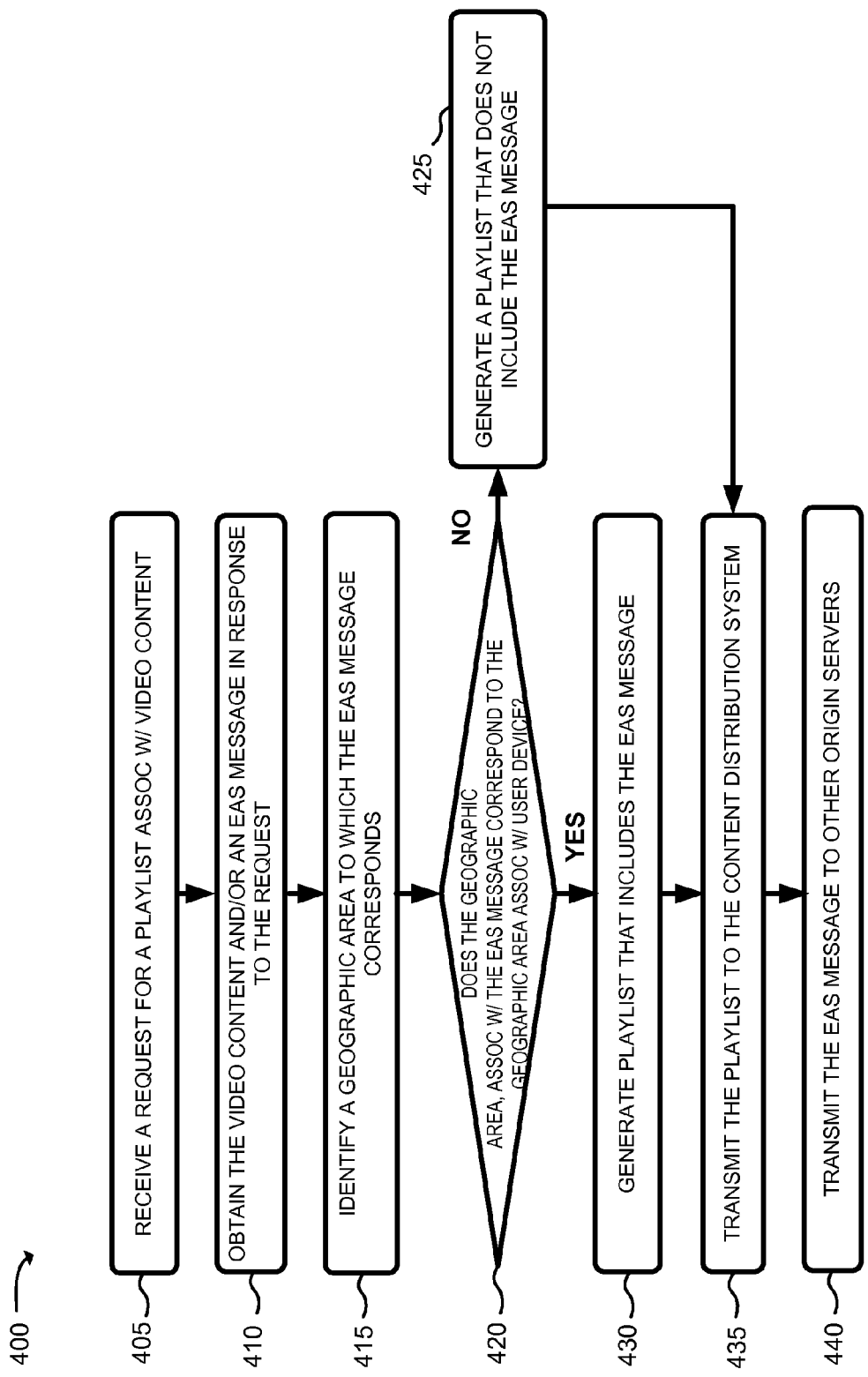
FIG. 4 is a flow chart of an example process for generating and/or distributing a playlist based on whether an EAS message is included in the playlist according to an implementation described herein.

FIG. 4 is a flow chart of an example process 400 for generating and/or distributing a playlist based on whether an EAS message is included in the playlist according to an implementation described herein. In one example implementation, process 400 may be performed by origin server 140. In another example implementation, some or all of process 400 may be performed by a device or collection of devices separate from, or in combination with, origin server 140.

As shown in FIG. 4, process 400 may include receiving a request for a playlist associated with video content (block 405) and obtaining video content and/or an EAS message in response to the request (block 410). For example, user device 110 may transmit a request for video content to CDS 120. CDS 120 may receive the request and may transmit another request, for the video content, to origin server 140. The other request may include information that identifies a location associated (e.g., a zip code, a FIPS code, a county name, etc.) with user device 110. Origin server 140 may receive the other request and may obtain video content segments associated with the video content. Origin server 140 may, for example, obtain the video content from content provider 145 and may break the video content into the video content segments. In another example, origin server 140 may communicate with encoder device 135 to obtain the video content segments. Origin server 140 may also receive EAS segments, associated with an EAS message, from encoder device 135.

As also shown in FIG. 4, process 400 may include identifying a geographic area to which the EAS message corresponds (block 415). For example, origin server 140 may analyze the EAS segments to obtain, from the EAS message, information associated with a geographic area to which the EAS message corresponds. Additionally, or alternatively, origin server 140 may identify a geographic area in which user device 110 is located. In one example, origin server 140 may obtain, from the other request, information associated with a location of user device 110. In another example, origin server 140 may obtain information associated with the location of user device 110 from a memory associated with origin server 140. In another example, origin server 140 may communicate, with CDS 120, to identify the geographic location associated with user device 110.

If the geographic area, associated with the EAS message does not correspond to the geographic area associated with the user device (block 420—NO), then process 400 may include generating a playlist that does not include the EAS message (block 425). For example, origin server 140 may determine whether the geographic area, associated with the EAS message, corresponds to the geographic area in which user device 110 is located by comparing the geographic area, associated with the EAS message, to the geographic area in which user device 110 is located. Based on a determination that the geographic area, associated with the EAS message, does not correspond to the geographic area in which user device 110 is located, origin server 140 may generate a playlist based on the video content segments.

If the geographic area, associated with the EAS message, corresponds to the geographic area associated with the request (block 420—YES), then process 400 may include generating a playlist that includes the EAS message (block 430). For example, origin server 140 may determine that the geographic area, associated with the EAS message, corresponds to the geographic area in which user device 110 is located. Based on the determination that the geographic area, associated with the EAS message, corresponds to the geographic area in which user device 110 is located, origin server 140 may generate a playlist (e.g., such as playlist 300 of FIG. 3) based on the video content segments and/or the EAS segments. In another example implementation, origin server 140 may generate a first playlist that includes the video content segments and a second playlist that includes the EAS segments.

As further shown in FIG. 4, process 400 may include transmitting the playlist to the user device (block 435) and/or transmitting the EAS message to another origin server (block 440). For example, origin server 140 may transmit the playlist to user device 110, via CDS 120, in response to the request for the video content. User device 110 may receive the playlist and may play the video content based on the video content segments that are included within the playlist. User device 110 may, in one example, determine a bandwidth and/or data rate that data is being received and may identify, from the playlist, a segment list (e.g., segment list 300, 320, etc. of FIG. 3) that corresponds to the bandwidth and/or data rate at which user device 110 is receiving data.

If the playlist includes the EAS segments, user device 110 may begin playing a portion of the EAS message when user device 110 reaches a point, within the playlist, that corresponds to an EAS segment associated with the portion of the EAS message. User device 110 may play the portion of the EAS message without tuning to another channel and/or frequency to receive and/or play the portion of the EAS message.

Additionally, or alternatively, origin server 140 may transmit the EAS segments to another origin server 140. Transmitting the EAS segments to the other origin server 140 may allow the other origin server 140 to transmit the EAS segments to another user device 110 that has subscribed to an EAS service associated with the geographic area that corresponds to the EAS message.

Figure 5:
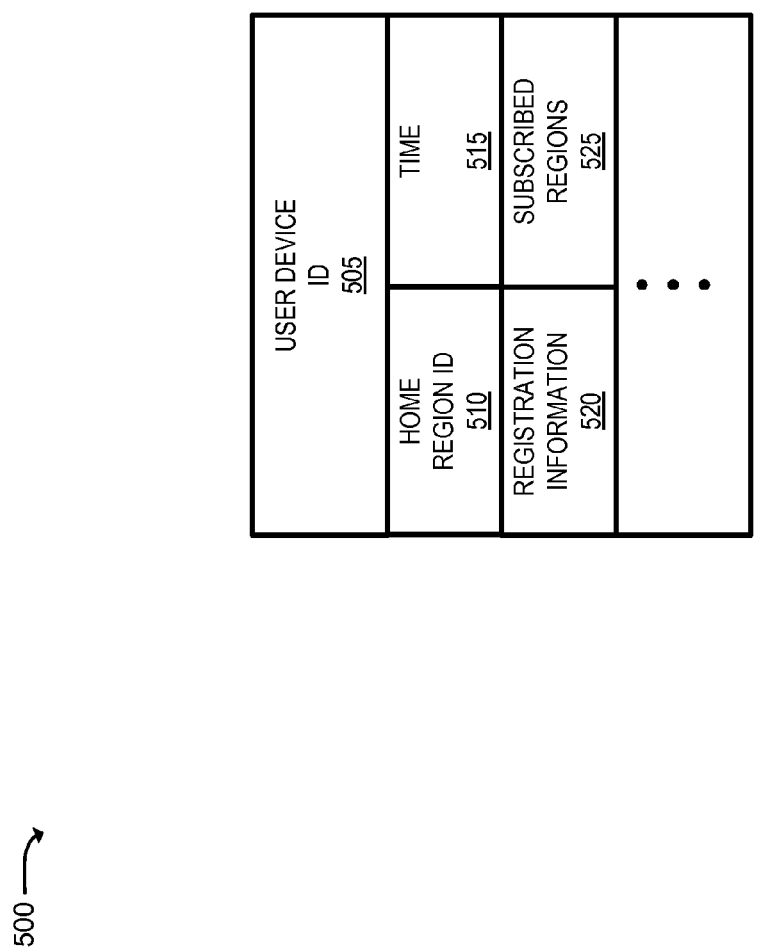
FIG. 5 is a diagram of an example data structure that stores registration information, associated with an EAS service, according to an implementation described herein.

FIG. 5 is a diagram of an example data structure 500 that stores registration information, associated with an EAS service, according to an implementation described herein. In one implementation, data structure 500 may be stored in a memory associated with origin server 140. Data structure 500 may include a collection of fields, such as a user device identifier (ID) field 505, a home region ID field 510, a time field 515, a registration information field 520, and a subscribed regions field 525. Data structure 500 includes fields 505-525 for explanatory purposes. In practice, data structure 500 may include additional fields, fewer fields, different fields, and/or differently arranged fields than are described with respect to data structure 500.

User device identifier (ID) field 505 may store information associated with a particular user device 110, such as a device identifier (e.g., a mobile directory number (MDN), a landline directory number (LDN), etc.), a network address (e.g., a media access control (MAC) address, an IP address, etc.), etc. Home region ID field 510 may store information associated with a home geographic region in which the particular user device 110 is usually located and/or has registered as a home location, such as an area identifier (e.g., a zip code, a FIPS code, a county name, an area code, a postal address, a state name, a set of latitude and longitude coordinates, etc.). Additionally, or alternatively, home region ID field 510 may store information that identifies another origin server 140 (e.g., a device identifier, a MAC address, an IP address, etc.) from which the particular user device 110 usually receives EAS messages and/or video content.

Time field 515 may store a time at which the particular user device 110 registered with origin server 140 associated with a remote geographic area that is different than the home geographic region identified in home region ID field 510. In other words, when the particular user device 110 moves to the remote geographic region and/or registers with origin server 140, associated with the remote geographic region, origin server 140 may store a time at which user device 110 registered with origin server 140. Registration information field 520 may store information that allows the particular user device 110 to communicate with origin server 140, associated with the remote geographic area, to access an EAS messaging service associated with the home geographic area. Subscribed regions field 525 may store information that identifies one or more other EAS message services, associated with one or more other geographic regions, to which the particular user device 110 is subscribed and/or from which EAS messages are to be received.

FIG. 6 is a flow chart of an example process 600 for registering user device 110, associated with a remote geographic area, with origin server 140 to receive an EAS message associated with the remote geographic area, according to an implementation described herein. In one example implementation, process 600 may be performed by origin server 140. In another example implementation, some or all of process 600 may be performed by a device or collection of devices separate from, or in combination with, origin server 140.

As shown in FIG. 6, process 600 may include receiving, from a user device associated with a remote geographic area, a request to register (block 605). For example, user device 110, associated with a remote geographic area may travel to a geographic area with which origin server 140 is associated. User device 110 may transmit, to origin server 140, a request to register with origin server 140 to receive an EAS message associated with the geographic area and/or the remote geographic area. The request may include information, associated with user device 110, such as a device identifier (e.g., a MDN, an LDN, etc.), a network address (e.g., a MAC address, an IP address, etc.), etc. Additionally, or alternatively, the request may include information that identifies another origin server 140, associated with the remote geographic area with which user device 110 is associated.

As also shown in FIG. 6, process 600 may include registering the user device and/or transmitting registration information to user device 110 (block 610). For example, origin server 140 may receive the request and may compare the information, associated with user device 110 and obtained from the request, with other information, associated with user device 110, stored in a memory associated with origin server 140. Origin server 140 may determine that the information, associated with user device 110, does not match the other information associated with user device 110. Origin server 140 may not register user device 110 based on the determination that the information, associated with user device 110, does not match the other information associated with user device 110.

In another example, origin server 140 may determine that the information, associated with user device 110, matches the other information associated with user device 110. Based on the determination that the information, associated with user device 110, matches the other information, associated with user device 110, origin server 140 may register user device 110.

In another example implementation, origin server 140 may communicate with the other origin server 140, associated with the remote geographic area, to authenticate user device 110. Origin server 140 may not register user device 110 based on a notification, received from the other origin server 140, that user device 110 cannot be authenticated. Origin server 140 may register user device 110 based on another notification, received from the other origin server 140, that user device 110 has been authenticated.

In another example, origin server 140 may communicate with user device 110 to identify one or more other origin servers 140, associated with one or more remote geographic areas, from which user device 110 is to receive EAS messages. Origin server 140 may store registration information that includes information associated with user device 110 and/or that identifies other origin servers 140, from which user device 110 is to receive EAS messages that are associated with the identified remote geographic areas.

As further shown in FIG. 6, process 600 may include transmitting, to another origin server associated with the remote geographic area, a notification that the user device has been registered (block 615) and/or receiving an EAS message, from the other origin server associated with the remote geographic area (block 620). For example, origin server 140 may, as a result of registering user device 110, transmit a notification, to the other origin server 140 associated with the other remote geographic area, that indicates that user device 110 has registered with origin server 140. The other origin server 140 may receive the notification and may use the notification as a trigger to transmit, to origin server 140, an EAS message that is associated with the remote geographic area. In another example, the other origin server 140 may transmit, to origin server 140, an EAS message, associated with the remote geographic area, when the notification has not been received.

Origin server 140 may receive an EAS message and may determine from which other origin server 140 the EAS message is received and/or with which geographic area the EAS message is associated. In one example, origin server 140 may not transmit the EAS message to user device 110 based on a determination that the other origin server 140, from which the EAS message was received, does not match information associated with another origin server 140 that is identified by the registration information. Additionally, or alternatively, origin server 140 may not transmit the EAS message to user device 110 based on a determination that a remote geographic area, with which the EAS message is associated, does not match a remote geographic area identified by the registration information.

As yet further shown in FIG. 6, process 600 may include transmitting the EAS message, associated with the remote geographic area, to the user device (block 625). For example, origin server 140 may transmit the EAS message to user device 110 based on a determination that the other origin server 140, from which the EAS message was received, matches information associated with the other origin server 140 that is identified by the registration information. Additionally, or alternatively, origin server 140 may transmit the EAS message, to user device 110, based on a determination that the remote geographic area, with which the EAS message is associated, matches a remote geographic area identified by the registration information.

In another example, origin server 140 may generate EAS segments based on the EAS message. Origin server 140 may generate a playlist that includes video content segments (e.g., associated with video content requested by and/or being received by user device 110) and the EAS segments. Origin server 140 may transmit the playlist to user device 110. User device 110 may receive the EAS message and/or the playlist and may play the EAS message and/or the portions of the EAS message that correspond to the EAS segments included within the playlist.

FIG. 7 is a flow chart of an example process 700 for provisioning an EAS message service to a user device based on a geographic area to which the EAS message corresponds. In one example implementation, process 700 may be performed by CDS 120. In another example implementation, some or all of process 700 may be performed by a device and/or system or collection of devices and/or systems separate from, or in combination with, CDS 120.

As shown in FIG. 7, process 700 may include receiving, from a user device, a request for video content (block 705) and obtaining a playlist associated with the video content in response to the request (block 710). For example, CDS 120 may receive, from user device 110, a request for video content and CDS 120 may, in response to the request, transmit another request, for the video content, to origin server 140. Origin server 140 may receive the request and may obtain the video content from content provider 145. Origin server 140 may, in a manner similar to that described above with respect to FIG. 4, process the video content to create video content segments associated with the video content. Origin server 140 may also, or alternatively, communicate with encoder device 135 to obtain the video content segments and/or EAS segments associated with a geographic area in which user device 110 is located and/or with which CDS 120 is associated. Origin server 140 may generate a playlist based on the video content segments and/or the EAS segments and may transmit the playlist to CDS 120. CDS 120 may receive the playlist from origin server 140.

In another example implementation, origin server 140 may receive the EAS segments and may generate an EAS notification based on the EAS segments. Origin server 140 may transmit the EAS notification to CDS 120 (e.g., based on an IP-based protocol, a hypertext transfer protocol (HTTP), and/or some other protocol). Origin server 140 may also, or alternatively, transmit a playlist, associated with the video content and that does not include the EAS segments, to CDS 120. CDS 120 may receive the playlist and/or the EAS notification from origin server 140. Origin server 140 may also transmit the EAS segments and/or the EAS notification to other origin server 140.

As also shown in FIG. 7, process 700 may include determining that an EAS message is associated with the playlist (block 715) and identifying a geographic area to which the EAS message corresponds (block 720). For example, CDS 120 may determine that an EAS message is associated with the playlist when EAS segments are detected within the playlist. CDS 120 may identify, from the EAS segments, a geographic area (e.g., based on a zip code, a FIPS code, a county identifier, etc.) to which the EAS message corresponds.

In another example, CDS 120 may process an EAS notification, received from origin server 140, to identify a geographic area to which the EAS notification corresponds (e.g., based on a zip code, FIPS code, a county identifier, etc. obtained from the EAS notification).

As further shown in FIG. 7, process 700 may include transmitting the playlist to the user device (block 725) and transmitting the playlist to other user devices located within the geographic area (block 730). For example, CDS 120 may determine which type of device (e.g., a handheld wireless device, a tablet computer, a laptop computer, etc.) corresponds to user device 110 and may identify a version of the playlist that includes segments, associated with a format and/or data rate that can be received and/or played by the type of device, that corresponds to user device 110. CDS 120 may transmit the identified version of the playlist, associated with the EAS message, to user device 110. CDS 120 may also, or alternatively, transmit the playlist to other user devices 110 that are located within the geographic area and which have requested or are receiving the video content.

In another example implementation, CDS 120 may transmit a playlist, that is not associated with the EAS message (e.g., which does not include EAS segments), to user device 110 and/or other user devices 110 that have requested and/or are receiving the video content. In this example, CDS 120 may transmit the EAS notification and/or EAS segments to user device 110 and/or the other user devices 110 based on a determination that user device 110 and/or the other user devices 110 are located within the geographic area to which the EAS message corresponds.

A system and/or method, described herein, may allow an EAS messaging service to be provisioned to a user device that is receiving broadcast video content from a service provider network. The system and/or method may allow an origin server to generate a playlist, associated with video content, in a manner that includes an EAS message that has been converted to a video format. The system and/or method may allow the origin server to distribute the playlist to a content distribution system associated with a geographic area to which the EAS message corresponds. The system and/or method may allow the content distribution system to transmit the playlist to the user device and/or another user device that has requested the video content and/or is located within the geographic area. The system and/or method may allow the user devices to receive and/or play the EAS message via a channel on which the video content is received and/or is being played.

The system and/or method may allow the origin server to transmit the EAS message to a remote origin server that is not associated with the geographic area. Transmitting the EAS message, to the remote origin server, may allow the remote origin server to transmit the EAS message to a user device, associated with the geographic area, that is located within the remote geographic region.

The system and/or method may, in another implementation, allow an origin server to receive an EAS message, associated with a geographic area, and to generate an EAS notification based on the EAS message. The origin server may transmit the EAS notification to a content distribution system. The system and/or method may allow the content distribution system to transmit the EAS notification to one or more user devices that are located within the geographic area.

The system and/or method may allow the origin server to transmit the EAS notification to a remote origin server, that is associated with another geographic area. Transmitting the EAS notification, to the remote origin server, may allow the remote origin server to transmit the EAS notification to another user device, associated with the geographic area, that is located within the other geographic area.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 4, 6, and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device and from a user device, a request for video content;
obtaining, by the server device, the video content based on the request;
processing, by the server device, the video content to generate one or more first segments,
   each segment of the one or more first segments corresponding to a respective portion of the video content;
monitoring, by the server device, traffic to detect an emergency alert system (EAS) message;
encoding, by the server device, the EAS message as an EAS video stream;
processing, by the server device, the EAS video stream to generate one or more second segments,
   each segment of the one or more second segments corresponding to a respective portion of the EAS message; and
selectively transmitting, to the user device, a first playlist or a second playlist, the first playlist including the one or more first segments and not including the one or more second segments,
the second playlist including the one or more first segments and including the one or more second segments,
the first playlist allowing the user device to receive or play the video content on a particular channel based on the one or more first segments and being transmitted to the user device based on a determination that the user device is not located within a particular geographic area, and
the second playlist allowing the user device to receive or play the EAS message, based on the one or more second segments, without tuning to a channel different from the particular channel and being transmitted to the user device based on a determination that the user device is located within the particular geographic area.

2. The method of claim 1, where the server device is associated with a geographic area, and the method further includes:
transmitting the EAS message to another server device associated with a different geographic area,
   where transmitting the EAS message to the different geographic area allows the other server device to transmit the EAS message to another user device that is located within the different geographic area.

3. The method of claim 1, further comprising:
receiving, from another user device, a request to register with the server device,
   where the other user device is associated with a different geographic area than a geographic area with which the server device is associated; and
registering the other user device based on the request to register,
   where registering the other user device allows the server device to transmit another EAS message, that corresponds to the different geographic area, to the other user device.

4. The method of claim 1, further comprising:
receiving another EAS message;
identifying a geographic area associated with the other EAS message;
retrieving registration information associated with one or more user devices; and
transmitting the other EAS message, to at least one user device, of the one or more user devices, based on a determination that the registration information, associated with the at least one user device, indicates that the at least one user device is registered for the identified geographic area.

5. The method of claim 1, where, when processing the video content to generate the one or more first segments, the method includes:
obtaining the one or more first segments,
   where each of the one or more first segments corresponds to a particular data rate at which the respective portion of the video content is to be transmitted by the server device or played by the user device.

6. The method of claim 1, further comprising:
receiving another EAS message;
identifying a geographic area associated with the other EAS message;
determining that the geographic area does not correspond to the particular geographic area; and
transmitting another playlist, associated with other video content, that does not include one or more segments associated with the other EAS message.

7. The method of claim 1, where selectively transmitting the first playlist or the second playlist further includes:
transmitting the first playlist or the second playlist to a content distribution system,
   where transmitting the first playlist or the second playlist to the content distribution system allows the content distribution system to:
   provide the first playlist or the second playlist to the user device at a data rate or in a format that can be received or played by the user device, or
   provide the second playlist to one or more other user devices that have requested the video content and are located within a geographic area associated with the EAS message.

8. A content distribution system comprising:
one or more devices to:
receive, from a user device, a request for video content;
obtain, based on the request, a plurality of segments associated with the video content;
   the plurality of segments including a first portion of segments and a second portion of segments,
      each segment of the first portion of segments corresponding to a respective portion of the video content, and
      each segment of the second portion of segments corresponding to a respective portion of an emergency alert system (EAS) message,
         the EAS message being encoded as an EAS video stream based on detecting a message associated with an EAS and being processed to generate the second portion of segments ; and
selectively transmit, to the user device, a first playlist or a second playlist,
   the first playlist including the first portion of segments and not including the second portion of segments,
   the second playlist including the first portion of segments and including the second portion of segments,
   the first playlist allowing the user device to receive or play the video content on a particular channel based on the first portion of segments and being transmitted to the user device based on a determination that the user device is not located within a particular geographic area, and
   the second playlist allowing the user device to receive or play the EAS message, based on the second portion of segments, without tuning to a channel different from the particular channel and being transmitted to the user device based on a determination that the user device is located within the particular geographic area.

9. The content distribution system of claim 8, where the one or more devices are further to:
receive a notification associated with the EAS;
identify a geographic area associated with the notification; and
transmit the notification to one or more user devices that are located within the geographic area.

10. The content distribution system of claim 8, where at least one of the first playlist or the second playlist includes at least two of:
a first segment, of the plurality of segments, associated with the video content, for transmission at a first data rate,
a second segment, of the plurality of segments, associated with the video content, for transmission at a second data rate,
a third segment, of the plurality of segments, associated with the EAS message, for transmission at the first data rate, or
a fourth segment, of the plurality of segments, associated with the EAS message, for transmission at the second data rate.

11. The content distribution system of claim 8, where the one or more devices, when selectively transmitting the first playlist or the second playlist, are further to:
allow the user device to play the video content at a particular frequency.

12. The content distribution system of claim 9, where the one or more devices are further to:
identify a geographic area associated with the EAS message; and
transmit the first playlist or the second playlist to another user device, located within the geographic area, that has requested or is receiving the video content.

13. The content distribution system of claim 12, where the first playlist or the second playlist is transmitted to the user device or the other user device based a video format.

14. The content distribution system of claim 12, where the one or more devices are further to:
determine that the user device is a first type of user device;
determine that the other user device is a second type of user device;
transmit, to the user device, the first portion of the segments and the second portion of segments at a first data rate or using a first format that can be received or played by the user device; and
transmit, to the other user device, the first portion of the segments and the second portion of segments at a second data rate or using a second format that can be received or played by the other user device,
where the first data rate is different than the second data rate, and
where the first format is different than the second format.

15. A non-transitory computer-readable medium storing instructions, the instructions comprising:
one or more instructions which, when executed by a processor, cause the processor to:
receive, from a user device, a request for video content;
transmit, based on the request, another request for the video content;
receive, based on the other request, a plurality of segments associated with the video content,
the plurality of segments including a first portion of segments and a second portion of segments,
each segment of the first portion of segments corresponding to a respective portion of the video content, and
each segment of the second portion of segments corresponding to a respective portion of an emergency alert system (EAS) message,
the EAS message being encoded as an EAS video stream based on detecting a message associated with an EAS and being processed to generate the second portion of segments;
identify a geographic area associated with the EAS message; and
selectively transmit, to the user device and based on a location of the user device, a first playlist or a second playlist,
the one or more instructions to selectively transmit the first playlist or the second playlist including:
one or more instructions to transmit, to the user device and based on a determination that the user device is not located within the identified geographic area, the first playlist for playing the first portion of segments on a particular channel,
the first playlist including the first portion of segments and not including the second portion of segments; or
one or more instructions to transmit, to the user device and based on a determination that the user device is located within the identified geographic area,
the second playlist for playing the second portion of segments without tuning to a channel different from the particular channel,
the second playlist including the first portion of segments and the second portion of segments, and
the second playlist allowing the user device to play the video content based on the first portion of segments and the EAS message based on the second portion of segments.

16. The computer-readable medium of claim 15, where the first portion of segments and the second portion of segments are based on a video format.

17. The computer-readable medium of claim 15, where the instructions further include:
one or more instructions to transmit the second playlist to a server device associated with another geographic area that is different than the identified geographic area,
where the second playlist allows the server device to transmit the second playlist to another user device, associated with the identified geographic area, that is located within the other geographic area.

18. The computer-readable medium of claim 15, where the one or more instructions to identify the geographic area associated with the message further include:
one or more instructions to obtain, from at least one segment of the second portion of segments, information identifying the geographic area.

19. The computer-readable medium of claim 15, where the instructions further include:
one or more instructions to receive another EAS message;
one or more instructions to generate one or more segments that correspond to the other EAS message,
where the one or more instructions to generate the one or more segments causes the other EAS message to be divided into one or more portions; and one or more instructions to transmit the one or more segments to a server device associated with another geographic area that is different than the identified geographic area.

20. The computer-readable medium of claim 19, where the instructions further include:
one or more instructions to generate another one or more segments associated with other video content,
where the other one or more segments correspond to one or more portions of the other video content;
one or more instructions to generate a third playlist that includes the one or more segments and the other one or more segments; and
one or more instructions to transmit the third playlist to a content distribution system,
where the third playlist allows the content distribution system to distribute the third playlist to another user device that is located within a geographic area associated with the other EAS message.

21. The computer-readable medium of claim 15, where the instructions further include:
one or more instructions to receive a request, from another user device that is located within a first geographic area, to register the other user device;
one or more instructions to store registration information, associated with the other user device, that identifies that the other user device is associated with a second geographic area,
where the second geographic area is different from the first geographic area;
one or more instructions to receive a first EAS message associated with the first geographic area; and
one or more instructions to transmit the first EAS message to the other user device based on a determination that the other user device is located within the first geographic area.

22. The computer-readable medium of claim 21, where the instructions further include:
one or more instructions to receive a second EAS message associated with the second geographic area; and
one or more instructions to transmit the second EAS message to the other user device based on a determination that the registration information indicates that the other user device is associated with the second geographic area.

\* \* \* \* \*